(12) United States Patent
Liang

(10) Patent No.: US 9,152,126 B2
(45) Date of Patent: Oct. 6, 2015

(54) DRIVING FORCE TRANSMISSION MECHANISM FOR IMAGE FORMING APPARATUS AND PROCESSING CARTRIDGE

(71) Applicant: ZHUHAI SEINE TECHNOLOGY CO., LTD, Zhuhai (CN)

(72) Inventor: Jun Liang, Zhuhai (CN)

(73) Assignee: ZHUHAI SEINE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 14/044,727

(22) Filed: Oct. 2, 2013

(65) Prior Publication Data

US 2014/0029982 A1 Jan. 30, 2014

Related U.S. Application Data

(63) Continuation of application No. PCT/CN2011/072841, filed on Apr. 15, 2011.

(30) Foreign Application Priority Data

Dec. 11, 2010 (CN) .......................... 2010 1 0605153

(51) Int. Cl.
*G03G 15/00* (2006.01)
*G03G 21/18* (2006.01)
*F16D 1/112* (2006.01)

(52) U.S. Cl.
CPC ............ *G03G 21/1857* (2013.01); *F16D 1/112* (2013.01); *G03G 15/757* (2013.01)

(58) Field of Classification Search
CPC ............ G03G 15/757; G03G 15/5008; G03G 21/186; G03G 21/1647; G03G 21/1857
USPC ......................................................... 399/167
See application file for complete search history.

(56) References Cited

U.S. PATENT DOCUMENTS 6,173,146 B1 * 1/2001 Wang et al. ................... 399/265
2003/0059233 A1 3/2003 Jang et al. ..................... 399/167

(Continued)

FOREIGN PATENT DOCUMENTS

CN 201897693 U 7/2011
DE 200 01 499 U1 7/2000

(Continued)

OTHER PUBLICATIONS

Machine translation of Matsuoka, JP 2003-186348 A, publication date: Jul. 4, 2003.*

(Continued)

*Primary Examiner* — Walter L Lindsay, Jr.
*Assistant Examiner* — Frederick Wenderoth
(74) *Attorney, Agent, or Firm* — J.C. Patents

(57) ABSTRACT

The present invention provides a driving force transmission mechanism for an image forming apparatus and a process cartridge. The transmission mechanism includes a photosensitive drum driving component (10) and an image forming apparatus driving head (20). The driving component (10) includes a drum shaft (3) which axially projects from an end of a photosensitive drum (1) and a boss (4) which axially projects from an end surface of the drum shaft (3). A tooth (5a) is obliquely arranged on a side wall (4b) of the boss and projects in a radial direction. The driving head (20) includes a recess (11) with a twisted-surface and matching with the boss (4), the recess has a polygonal cross section with a twisted corner section. The process cartridge includes the driving component. The photosensitive drum driving component is easy to manufacture and is not easy to be damaged when using for a long time.

14 Claims, 5 Drawing Sheets

(56) References Cited

U.S. PATENT DOCUMENTS

2006/0008287 A1* 1/2006 Noda et al. ............... 399/90
2012/0257906 A1* 10/2012 Zhao ....................... 399/111

FOREIGN PATENT DOCUMENTS

| JP | 2001-147618 A | 5/2001 |
| JP | 2001-324909 A | 11/2001 |
| JP | 2003-186348 A | 7/2003 |

OTHER PUBLICATIONS

International Search Report of International Application No. PCT/CN2011/072841, dated Sep. 22, 2011.

* cited by examiner

DRIVING FORCE TRANSMISSION MECHANISM FOR IMAGE FORMING APPARATUS AND PROCESSING CARTRIDGE

CROSS-REFERENCE TO RELATED APPLICATIONS

This application is a continuation of International Application No. PCT/CN2011/072841, filed on Apr. 15, 2011, which claims priority to Chinese Patent Application No. 201010605153.0, filed on Dec. 11, 2010, both of which are hereby incorporated by reference in their entireties.

FIELD OF THE TECHNOLOGY

The present invention relates to a driving force transmission mechanism for an image forming apparatus and a processing cartridge.

BACKGROUND

A toner cartridge can be detachably mounted into a main part of an image forming apparatus, and the cartridge, as a whole unit, comprises an electrophotographic photosensitive member and at least one of processing means such as charging means, developing means, cleaning means, or the like. Since the toner cartridge is detachably mountable relative to the main part of the apparatus, it is easy to maintain the apparatus. An electrophotographic image forming apparatus adopting electrophotographic imaging formation method functions as follows: an electrostatic latent image is formed by selectively exposing the electrophotographic photosensitive member uniformly charged by a charger to light passing through the image forming apparatus; the electrostatic latent image is developed with toner by a developing means into a toner image; and the toner image thus formed is transferred onto a recording medium by a transferring means to form an image on the recording material.

As shown in FIG. 1, the prior art has disclosed a method of transmitting the driving force between a photosensitive drum driving head 17 provided on the toner cartridge and an image forming apparatus driving head 18. A spiral triangular recess 18a is provided at an end of the image forming apparatus driving head 18, and a spiral triangular projection 17a is provided correspondingly at an end of the photosensitive drum driving head 17 in complementary with the triangular recess 18a for transmission. The driving force can be transmitted in this manner, however, during transmission of the driving force, the coaxial alignment of the rotation centers of the spiral triangular projection 17a and the spiral triangular recess 18a is difficult, thus leading to a certain shake during the power transmission between them. And the process of manufacturing such a spiral triangular projection 17a is complicated, the cost of making mould is high, and the photosensitive drum driving head 17 is easy to deform or to be damaged during long time operation, which will affect the driving accuracy and efficiency.

SUMMARY

This invention provides a driving force transmission mechanism of an image forming apparatus, to solve the technical problem that the manufacturing of the photosensitive drum driving head for the driving force transmission mechanism of the image forming apparatus in the art is complicated and the photosensitive drum driving head is easy to deform or to be damaged during long time operation, which will affect the driving accuracy and efficiency.

To solve the above technical problem, the invention provides the following technical solution:

a driving force transmission mechanism of an image forming apparatus includes a photosensitive drum driving component and an image forming apparatus driving head, the photosensitive drum driving component includes a drum shaft which axially projects from an end of the photosensitive drum and rotatably supports the photosensitive drum during operation, and a boss which axially projects from an end surface of the drum shaft, the image forming apparatus driving head includes a recess with a twisted-surface matching with the boss, the recess has a polygonal cross section with a corner section, wherein a tooth extending in a radial direction of the boss is provided on a side of the boss, which is obliquely arranged on a side wall of the boss.

Optionally, the side wall of the boss is tangent to the inner wall of the recess.

Optionally, the boss is provided with a recess hole and a positioning pillar tangent to the inner wall of the recess hole is provided in the recess.

Optionally, the corner section of the recess is twisted or oblique.

Optionally, the boss has a circular cross section.

Optionally, the boss has a polygonal cross section.

Optionally, the tooth includes a first tooth for engaging with a twisted-surface of the twisted-recess and a second tooth adapted to abut an edge of an end surface of the twisted-recess.

Optionally, a cut plane perpendicular to a radial cross-section of the boss is provided on the boss at a position where the tooth is mounted on the boss, wherein the oblique direction of the tooth is parallel to the cut plane of the boss.

Optionally, the cylindrical boss, the tooth and the drum shaft are integrally formed by identical material. Optionally, the material is one of POM, ABS, PC and Cu.

The invention also provides a process cartridge, comprising a photosensitive drum and a photosensitive drum driving component at an end of the photosensitive drum. The photosensitive drum driving component includes a drum shaft which axially projects from an end of the photosensitive drum and rotatably supports the photosensitive drum during operation, and a boss which axially projects from an end surface of the drum shaft and matches with a recess of the image forming apparatus driving head, the recess has a twisted surface and a polygonal cross section with corner sections, wherein a tooth extending in a radial direction of the boss is provided on a side of the boss, which is obliquely arranged on a side wall of the boss.

Optionally, the side wall of the boss is tangent to an inner wall of the recess.

Optionally, the boss is provided with a recess hole, and a positioning pillar tangent to an inner wall of the recess hole is provided in the recess.

Optionally, the boss has a circular cross section.

Optionally, the boss has a polygonal cross section.

Optionally, the tooth includes a first tooth for engaging with a twisted-surface of the twisted-recess and a second tooth adapted to abut an edge of an end surface of the twisted-recess.

Optionally, a cut plane perpendicular to a radial cross-section of the boss is provided on the boss at the position where the tooth is mounted on the boss, wherein the oblique direction of the tooth is parallel to the cut plane of the boss.

Optionally, the cylindrical boss, the tooth and the drum shaft are integrally formed by identical material. Optionally, the material is one of POM, ABS, PC and Cu.

According to the above technical solutions, during transmission of the driving force, the side wall of the boss of the present photosensitive drum driving component is always tangent to the inner wall of the recess of the image forming apparatus driving head, which ensures the coaxial alignment of the rotation centers of the photosensitive drum driving component and the image forming apparatus driving head and avoids the undesirable shake during transmission of the driving force. And hence, the tooth on the boss is engaged with the twisted-surface in the recess of the driving head to drive the boss. Synchronous and coaxial rotation of the boss and the image forming apparatus driving head can be achieved. In the technical solution of the present invention, the photosensitive drum driving head has a simple structure, greatly saving the cost of design and production of the photosensitive drum driving component, and the photosensitive drum driving head cannot be easily damaged even after long time operation, solving the technical problems, such as complex manufacturing process of the photosensitive drum driving head of a driving force transmission mechanisms, in the existing image forming apparatus, high cost for making mould and the frequent deformation and damage during long time operation, which will affect the driving accuracy and efficiency.

DETAILED DESCRIPTION

The invention will be described in details through the embodiments and with reference to the drawings. It should be understood that the description of the embodiments is only used to explain the invention, but not to limit the invention.

Embodiment 1

Figure 1:
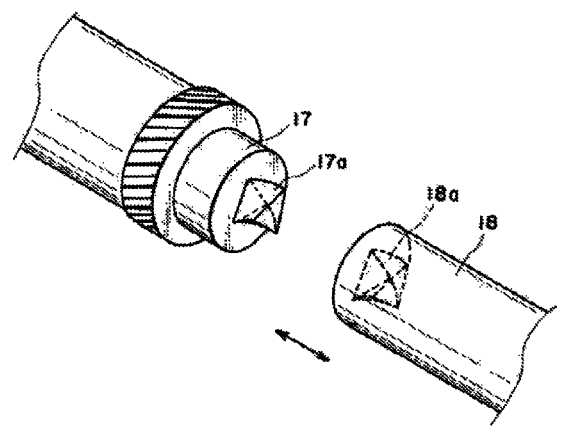
FIG. 1 is a decomposition diagram of an image forming apparatus driving head and a photosensitive drum driving head in the art.
Figure 2:
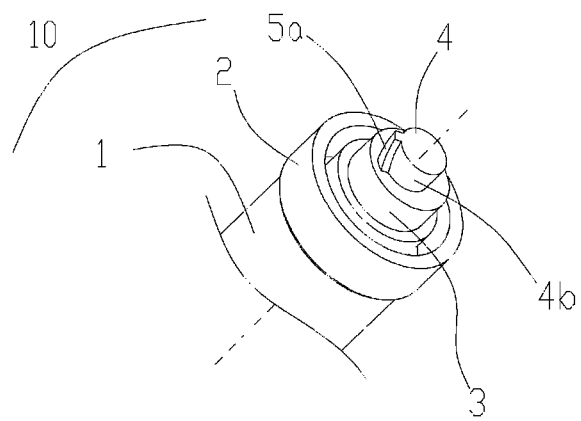
FIG. 2 is a stereoscopic diagram of a photosensitive drum driving component according to a first embodiment of the invention.

As shown in FIG. 2, a photosensitive drum driving component 10 of a process cartridge according to the present invention includes a drum gear 2 provided at an end of a photosensitive drum 1 and connected to the photosensitive drum 1 for transmitting received driving force to the photosensitive drum 1, a drum shaft 3 outwardly projected in an axis direction from an end of the drum gear 2 for rotatably supporting the photosensitive drum 1 during the operation of the process cartridge, and a boss 4 outwardly projected in an axis direction from an end surface of the drum shaft 3 for receiving driving force from an image forming apparatus driving head 20. The boss 4 has a circular cross section. A first tooth 5a extending in a radial direction of the boss 4 is provided on a side wall 4b of the boss 4, where the first tooth 5a is obliquely mounted on the side wall 4b of the boss. Optionally, the boss 4, the first tooth 5a, the drum shaft 3 and the drum gear 2 included in the photosensitive drum driving component are integrally formed by identical material, for material strength and performance consideration, which is preferably selected from high-strength resin, for example, polyformaldehyde (POM), polycarbonate (PC), acrylonitrile butadiene styrene copolymer (ABS) or the like, or metal such as copper.

Figure 3:
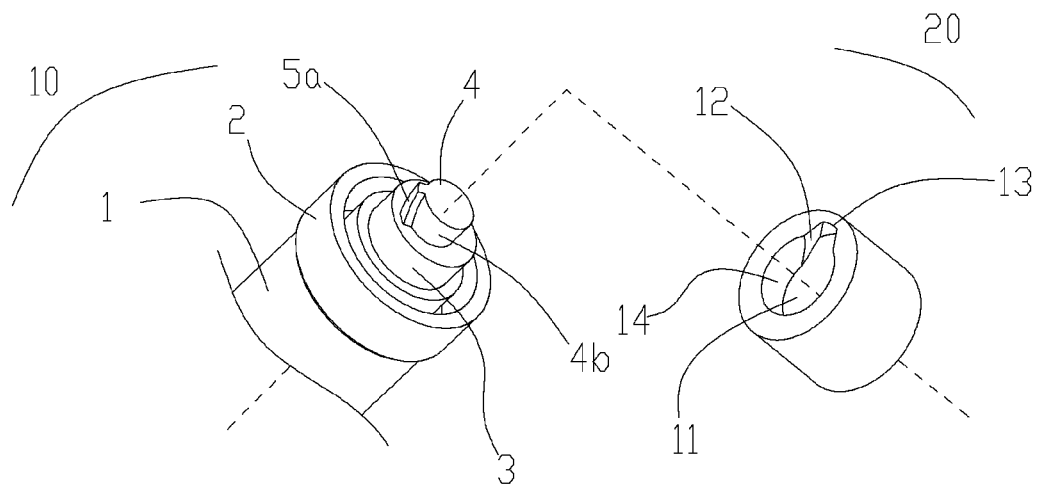
FIG. 3 is a decomposition diagram of a photosensitive drum driving component and an image forming apparatus driving head according to the first embodiment of the invention.

As shown in FIG. 3, the image forming apparatus driving head 20 adapted to match with the photosensitive drum driving component 10 of the invention for force transmission includes a recess 11 that may be a recess hole having a corner section including a twisted-surface. An arc surface 14 and the oblique or twisted corner section 13 are formed in the recess 11. The corner section 13 is provided with a twisted-surface 12. When the process cartridge is mounted into the image forming apparatus, the boss 4 can be inserted into the twisted recess 11. The first tooth 5a mounted on the boss 4 is hence engaged with the twisted-surface 12 in the recess 11 and the side wall 4b of the boss 4 can be tangent to the arc surface 14 in the recess 11, which ensure the alignment of the centers of the boss 4 and the recess 11 during transmission of the driving force. Since the first tooth 5a engaged with the image forming apparatus driving head 20 for force transmission is oblique so as to produce an axial tension between the image forming apparatus driving head 20 and the photosensitive drum driving component 10 in the process of their combination, which make it much easier to engage the photosensitive drum driving component 10 with the image forming apparatus driving head 20, and the photosensitive drum driving component 10 cannot escape from the image forming apparatus driving head 20 during the operation of the image forming apparatus. While the image forming apparatus driving head 20 rotates, the first tooth 5a mounted on the boss 4 is engaged with the twisted-surface 12 in the recess 11 of the driving head for rotating the boss 4, realizing synchronized rotation of the boss 4 and the image forming apparatus driving head 20, and finally the boss 4 transmits the driving force received from the image forming apparatus driving head 20 to the photosensitive drum 1 through a drum shaft 3 and a drum gear 2 connected to the boss so as to drive the photosensitive drum 1 into rotation.

Embodiment 2

Figure 4:
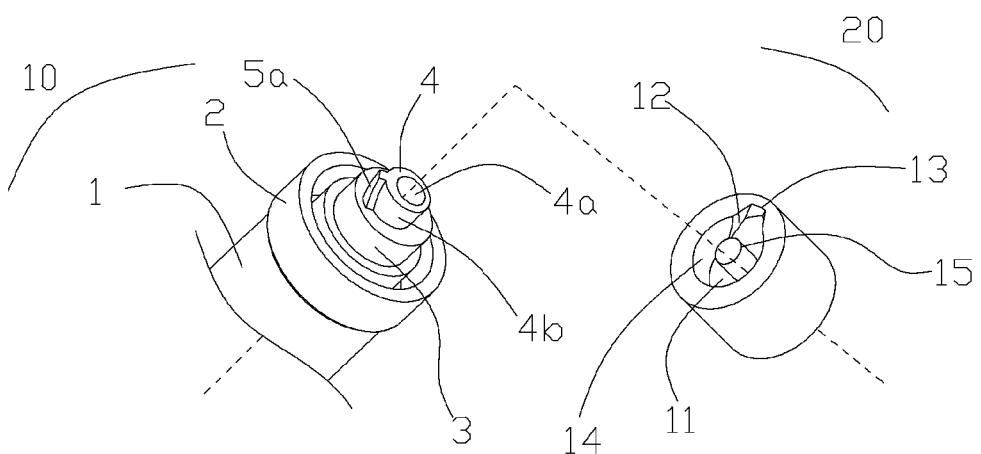
FIG. 4 is a decomposition diagram of a photosensitive drum driving component and an image forming apparatus driving head according to a second embodiment of the invention.

In the first embodiment, the centers of the photosensitive drum driving component 10 and the image forming apparatus driving head 20 are aligned in a manner that the side wall 4b of the boss of the photosensitive drum driving component 10 is tangent to the arc surface 14 of the recess 11 of the image forming apparatus. Compared with the first embodiment, in this embodiment as shown in FIG. 4, a recess hole 4a is provided in the boss of the photosensitive drum driving component and a positioning pillar 15 adapted to be tangent to an inner wall of the recess hole 4a of the photosensitive drum driving component 10 is provided in the recess 11 of the image forming apparatus driving head. During transmission of the driving force, the recess hole 4a is tangent to the positioning pillar 15 and engaged with the positioning pillar 15 so that the centers of the photosensitive drum driving component 10 and the image forming apparatus driving head 20 are aligned.

Embodiment 3

Figure 5:
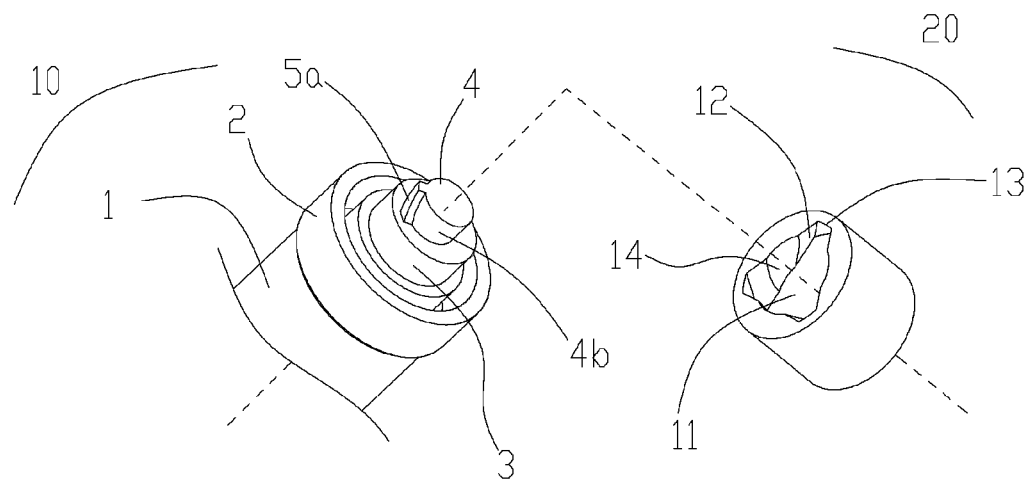
FIG. 5 is a decomposition diagram of a photosensitive drum driving component and an image forming apparatus driving head according to a third embodiment of the invention.

In this embodiment as shown in FIG. 5, in order to shorten the process of the combination of the photosensitive drum driving component 10 and the image forming apparatus driving head 20 and to improve the driving force transmission efficiency, three corner sections 13 with twisted-surfaces for engaging with the first tooth 5a of the photosensitive drum driving component are in the recess 11 of the image forming apparatus driving head, and an arc surface 14 adapted to tangently engage with a side wall 4b of the boss of the photosensitive drum driving component is also provided in the recess 11 of the image forming apparatus driving head. Thereby, when the photosensitive drum driving component 10 is combined with the image forming apparatus driving head 20, it takes no more than ⅓ turn of the rotation of the image forming apparatus driving head 20 to engage the boss with the twisted-surface 12 in the recess 11 of the image forming apparatus. Similarly, depending on the period of time required for the combination, the recess 11 may have two or more polygonal cross-sections symmetrical with respect to the central point of the recess 11, which cross-sections have a plurality of twisted or oblique corner sections.

Embodiment 4

Figure 6:
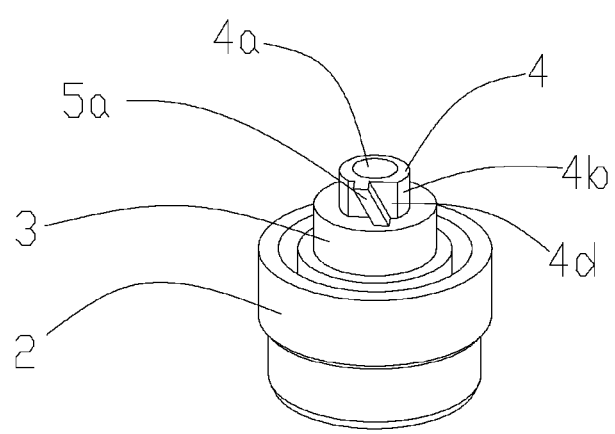
FIG. 6 is a stereoscopic diagram of a photosensitive drum driving component according to a fourth embodiment of the invention.

In this embodiment, as shown in FIG. 6, the boss 4 of the photosensitive drum driving component 10 has a cut plane 4d perpendicular to a radial cross-section of the boss 4, wherein the first tooth 5a is mounted on the cut plane 4d of the boss and the oblique direction of the first tooth 5a is parallel to the cut plane 4d of the boss, thereby achieving advantages of better formation of a photosensitive drum driving component 10 with a first oblique tooth 5a. In this embodiment, the boss 4 of the photosensitive drum driving component has an arched cross section.

Embodiment 5

Figure 7:
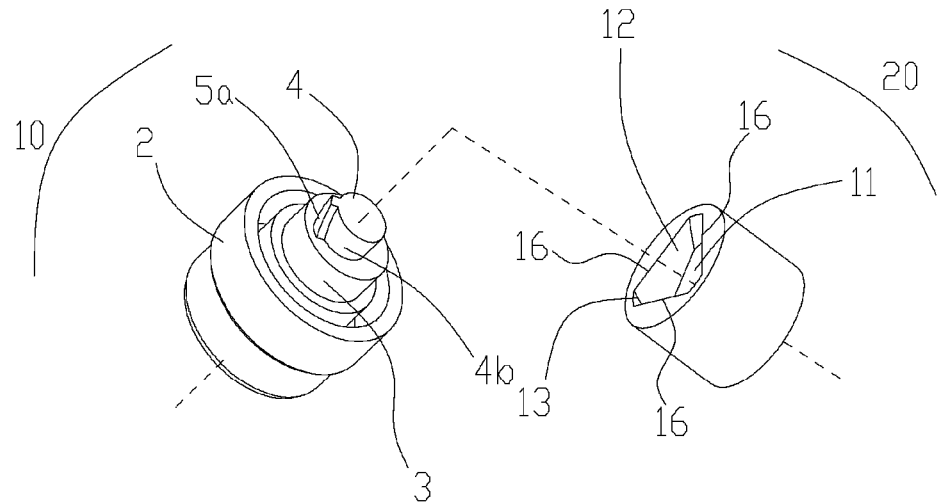
FIG. 7 is a decomposition diagram of a photosensitive drum driving component and an image forming apparatus driving head according to a fifth embodiment of the invention.
Figure 8:
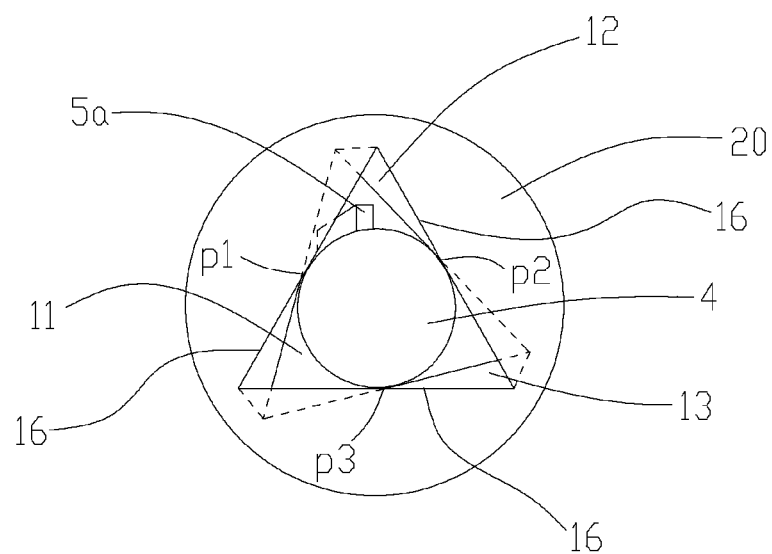
FIG. 8 is a top view of a photosensitive drum driving component engaged with an image forming apparatus driving head according to the fifth embodiment of the invention.

Compared to embodiment 3, in the embodiment as shown in FIGS. 7 and 8, the inner side wall of the recess 11 of the image forming apparatus driving head consist of three twisted-surfaces 12. During transmission of the driving force, the first tooth 5a on the boss 4 of the photosensitive drum driving component is engaged with one of the three twisted-surfaces 12 in the recess 11 to transmit the driving force. The side wall 4b of the boss of the photosensitive drum driving component tangently engages with edge 16 of the recess of the image forming apparatus at points P1, P2 and P3. As a result, the centers of the photosensitive drum driving component 10 and the image forming apparatus driving head 20 are aligned during transmission of the driving force.

Embodiment 6

Figure 9:
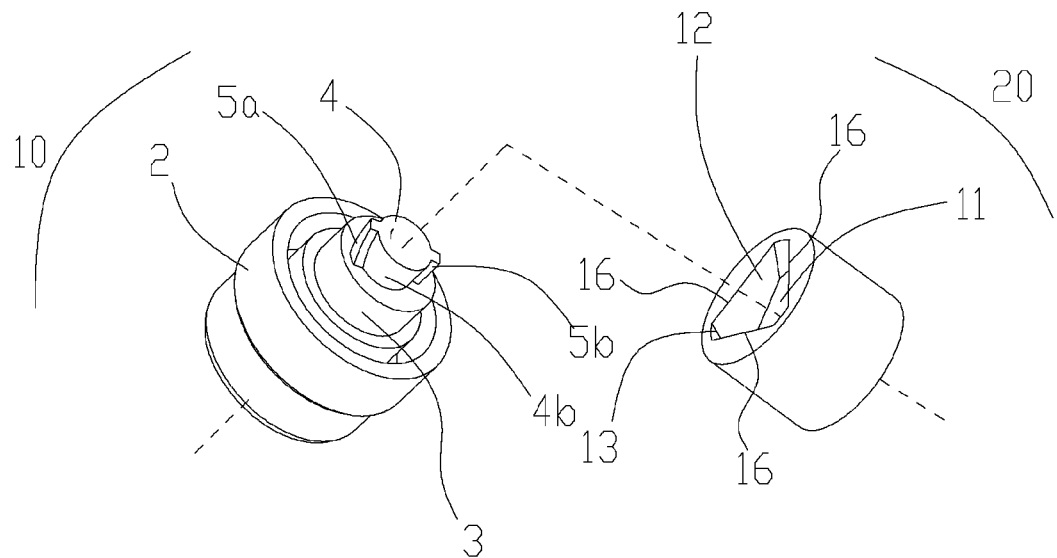
FIG. 9 is a decomposition diagram of a photosensitive drum driving component and an image forming apparatus driving head according to a sixth embodiment of the invention.
Figure 10:
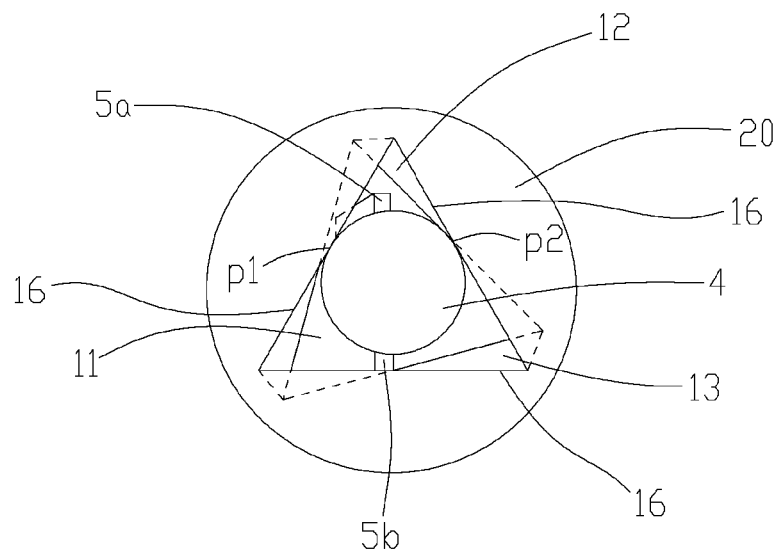
FIG. 10 is a top view of a photosensitive drum driving component engaged with an image forming apparatus driving head according to the sixth embodiment of the invention.

As shown in FIGS. 9 and 10, to enhance the stability of force transmission through the engagement between the photosensitive drum driving component 10 and the image forming apparatus driving head 20, in this embodiment which is a further improvement of embodiment 5, a second tooth 5b in corporation with the first tooth 5a to transmit force is provided on the side wall 4b of the boss of the photosensitive drum driving component 10 in the radial direction. The first tooth 5a on the boss may be engaged with one of the three twisted-surfaces 12 of the recess 11 of the image forming apparatus, while the second tooth 5b mounted on the boss 4 abuts one of the edges of the other two twisted-surfaces produce forming line-to-surface contact, so as to support the boss 4 during the operation of the photosensitive drum driving component 10. Compared with embodiment 5 where the boss 4 is engaged with the edges 16 of the recess at three points, in this embodiment, the boss 4 of the photosensitive drum driving component not only tangently engages with the edges 16 of the recess 11 of the image forming apparatus at points P1 and P2, but also the second tooth 5b of the boss forms line-to-surface contact with the associated edges 16 of the recess. As a result, the contact area of the boss 4 and the recess 11 is increased and the stability and reliability of the transmission of the driving force between the photosensitive drum driving component 10 and the image forming apparatus driving head 20 is enhanced.

Hereinabove, the above described are only preferred embodiments according to the present invention. It should be noted that, besides arch and circle shape mentioned in the above embodiments, the boss of the photosensitive drum driving component may have a cross section in any other shape, for example, polygon, such as, tetragon, pentagon and so on, as long as it can tangently engage with the recess of the image forming apparatus, which is conceivable to the skilled in the art. Similarly, in embodiment 6, a plurality of second teeth adapted to abut the edges of an end surface of the recess of the image forming apparatus can be provided. Any improvements, equivalents or modifications within the principle and spirit of the invention should fall within the scope of the invention.

What is claimed is:

1. A photosensitive drum driving component (10), for receiving driving force from an image forming apparatus driving head (20) including a recess (11) with three twisted-surfaces (12), each of the twisted-surfaces (12) having an edge (16), the photosensitive drum driving component (10) including:

a drum gear (2) provided at an end of a photosensitive drum (1) and connected to the photosensitive drum (1);

a drum shaft (3) which axially projects from the drum gear (2) and rotatably supports the photosensitive drum during operation; and a boss (4) which axially projects from an end surface of the drum shaft (3), wherein:

a first tooth (5a) and a second tooth (5b) are arranged on a side wall (4b) of the boss (4), the first tooth (5a) being obliquely arranged on the side wall (4b) of the boss, and the second tooth (5b) projecting from the side wall (4b) in an radial direction of the boss; and the first tooth (5a) is adapted to be engaged with one of the twisted-surfaces (12) in the recess (11), and the second tooth (5b) is adapted to abut one of edges corresponding to the other two twisted-surfaces.

2. The photosensitive drum driving component (10) according to claim 1, wherein the boss (4) has a circular cross section.

3. The photosensitive drum driving component (10) according to claim 1, wherein the boss (4) has a polygonal cross section.

4. The photosensitive drum driving component (10) according to claim 1, wherein a cut plane perpendicular to a cross-section in the radial direction of the boss (4) is provided at a position where the first tooth (5a) is mounted on the boss (4), and the oblique direction of the first tooth (5a) is parallel to the cut plane of the boss (4).

5. The photosensitive drum driving component (10) according to claim 1, wherein the boss (4), the teeth (5a, 5b) and the drum shaft (3) are integrally formed by identical material, and the material is one of POM, ABS, PC and Cu.

6. A process cartridge, comprising a photosensitive drum and a photosensitive drum driving component at an end of the photosensitive drum, the photosensitive drum driving component (10) being for receiving driving force from an image forming apparatus driving head (20) including a recess (11) with three twisted-surfaces (12), each of the twisted-surfaces (12) having an edge (16), the photosensitive drum driving component (10) including:
- a drum gear (2) provided at an end of the photosensitive drum (1) and connected to the photosensitive drum (1);
- a drum shaft (3) which axially projects from the drum gear (2) and rotatably supports the photosensitive drum during operation; and
- a boss (4) which axially projects from an end surface of the drum shaft (3), wherein:
- a first tooth (5a) and a second tooth (5b) are arranged on a side wall (4b) of the boss (4), the first tooth (5a) being obliquely arranged on the side wall (4b) of the boss, and the second tooth (5b) projecting from the side wall (4b) in an radial direction of the boss; and
- the first tooth (5a) is adapted to be engaged with one of the twisted-surfaces (12) in the recess (11), and the second tooth (5b) is adapted to abut one of edges corresponding to the other two twisted-surfaces.

7. The process cartridge according to claim 6, wherein while the image forming apparatus driving head (20) is rotated, the tooth mounted on the boss (4) is engaged with one of the twisted-surfaces (12) in the recess (11) of the driving head so that the boss rotates synchronously with the image forming apparatus driving head (20), and transmits the driving force received from the image forming apparatus driving head (20) to the photosensitive drum (1) through the drum shaft (3) and the drum gear (2) connected to the boss (4) in order to drive the photosensitive drum (1).

8. The process cartridge according to claim 6, wherein the side wall (4b) of the boss is tangent to a side wall of the recess (11).

9. The process cartridge according to claim 6, wherein a cut plane perpendicular to a cross-section in the radial direction of the boss (4) is provided at a position where the first tooth (5a) is mounted on the boss (4), and the oblique direction of the first tooth (5a) is parallel to the cut plane of the boss (4).

10. The process cartridge according to claim 6, wherein the boss (4), the teeth (5a, 5b) and the drum shaft (3) are integrally formed by identical material, and the material is one of POM, ABS, PC and Cu.

11. The photosensitive drum driving component (10) according to claim 1, wherein the second tooth (5b) extending in a direction parallel to the axis of the boss (4).

12. The photosensitive drum driving component (10) according to claim 1, wherein the photosensitive drum driving component (10) has one first tooth (5a) and one second tooth (5b).

13. The process cartridge according to claim 6, wherein the second tooth (5b) extending in a direction parallel to the axis of the boss (4).

14. The process cartridge according to claim 6, wherein the photosensitive drum driving component (10) has one first tooth (5a) and one second tooth (5b).

* * * * *